United States Patent
Gerhardt et al.

(10) Patent No.: US 10,259,481 B2
(45) Date of Patent: Apr. 16, 2019

(54) WHEELED PERSONAL TRANSPORTATION DEVICE

(71) Applicant: FORD GLOBAL TECHNOLOGIES, LLC, Dearborn, MI (US)

(72) Inventors: Torsten Gerhardt, London (GB); James Neugebauer, Chelmsford (GB); Robert Spahl, Cologne NRW (DE); Bruce Southey, Farnham (GB); Christoph Ruberg, Korschenbroich NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/809,565

(22) Filed: Nov. 10, 2017

(65) Prior Publication Data

US 2018/0127013 A1 May 10, 2018

(30) Foreign Application Priority Data

Nov. 10, 2016 (GB) .................................. 1618983.9

(51) Int. Cl.
*B62B 5/00* (2006.01)
*B62B 5/02* (2006.01)
(Continued)

(52) U.S. Cl.
CPC ............ *B62B 5/026* (2013.01); *B62B 5/0069* (2013.01); *B62B 5/0083* (2013.01); *B62H 3/00* (2013.01);
(Continued)

(58) Field of Classification Search
CPC .......... B62B 1/042; B62B 1/12; B62B 5/026; B62B 11/007; B62B 5/0036; B62B 5/0083
See application file for complete search history.

(56) References Cited

U.S. PATENT DOCUMENTS 4,264,082 A * 4/1981 Fouchey, Jr. ........... B62B 5/026
188/22
5,701,965 A * 12/1997 Kamen .................... A61G 5/04
180/21
(Continued)

FOREIGN PATENT DOCUMENTS

CA 2837433 A1 6/2015
CN 2077827 U 5/1991
(Continued)

OTHER PUBLICATIONS

Intellectual Property Office, Combined Search and Examination Report for Great Britain Patent Application No. GB1618982.1 dated Apr. 25, 2017.

*Primary Examiner* — Hau V Phan
(74) *Attorney, Agent, or Firm* — Frank MacKenzie; Brooks Kushman P.C.

(57) ABSTRACT

A motorized device for transporting a human or inanimate payload. A platform is configured to accommodate the payload and a pair of wheel clusters are mounted to the platform at opposite ends thereof and are powered in both rotation and in translation relative to the platform, for example by one or more electric motors housed in or on the platform or wheel clusters. Each of the wheel clusters comprises an arm, and a first and a second wheel rotatably mounted to respective opposite ends of the arm. Each of the wheels is independently powered about its respective axis of rotation. An electronic controller commands the motors to enable stable rolling movement of the device over a surface with only one wheel of each cluster in contact with the surface, and to allow the device to steer and to ascend and descend steps.

7 Claims, 14 Drawing Sheets

(51) Int. Cl.
*B62K 11/00* (2006.01)
*B62H 3/00* (2006.01)
*B62K 7/04* (2006.01)
*B62K 23/00* (2006.01)
*B62J 99/00* (2009.01)

(52) U.S. Cl.
CPC .............. *B62K 7/04* (2013.01); *B62K 11/007* (2016.11); *B62K 23/00* (2013.01); *B62B 5/0036* (2013.01); *B62B 5/0076* (2013.01); *B62J 2099/002* (2013.01)

(56) References Cited

U.S. PATENT DOCUMENTS

| | | | | |
|---|---|---|---|---|
| 5,868,403 | A * | 2/1999 | Culp | A61G 5/061 280/5.22 |
| 5,971,091 | A * | 10/1999 | Kamen | A61G 5/04 180/218 |
| 5,975,225 | A | 11/1999 | Kamen et al. | |
| 6,302,230 | B1 * | 10/2001 | Kamen | A63C 17/01 180/171 |
| 6,443,250 | B1 * | 9/2002 | Kamen | A61G 5/04 180/7.1 |
| 6,571,892 | B2 * | 6/2003 | Kamen | A61G 5/061 180/21 |
| 7,032,910 | B2 * | 4/2006 | Joie | A61M 1/36 280/47.131 |
| 7,422,079 | B2 * | 9/2008 | Hsiao | A61G 5/046 180/65.1 |
| 7,631,380 | B1 | 12/2009 | Larson | |
| 7,784,569 | B2 * | 8/2010 | Cheng | A61G 5/046 180/41 |
| 7,891,242 | B2 * | 2/2011 | Cheng | G01C 9/06 73/304 R |
| 8,260,459 | B2 * | 9/2012 | Herbert | B62D 57/02 700/245 |
| 8,641,059 | B2 * | 2/2014 | Khodor | B62B 1/12 280/47.28 |
| 8,702,108 | B2 * | 4/2014 | Zanderlehn | A61G 5/061 180/209 |
| 9,187,106 | B2 * | 11/2015 | Khodor | B62B 1/042 |
| 9,381,967 | B2 * | 7/2016 | Nakayama | B62K 3/007 |
| 2008/0295595 | A1 * | 12/2008 | Tacklind | A61G 5/14 73/462 |
| 2014/0163855 | A1 * | 6/2014 | Field | B60N 2/045 701/124 |
| 2015/0166088 | A1 | 6/2015 | Khodor | |

FOREIGN PATENT DOCUMENTS

| | | |
|---|---|---|
| EP | 2727570 A3 | 10/2015 |
| GB | 2446726 A | 8/2008 |
| JP | 2013031296 A | 2/2013 |
| JP | 2013208245 A | 10/2013 |

* cited by examiner

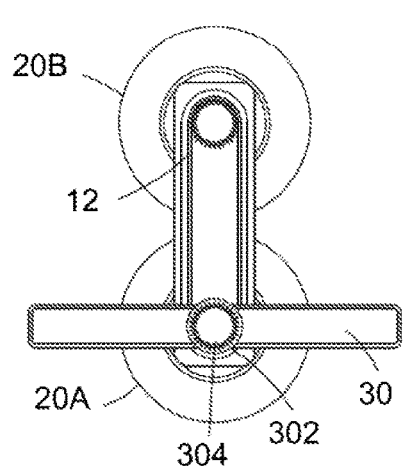
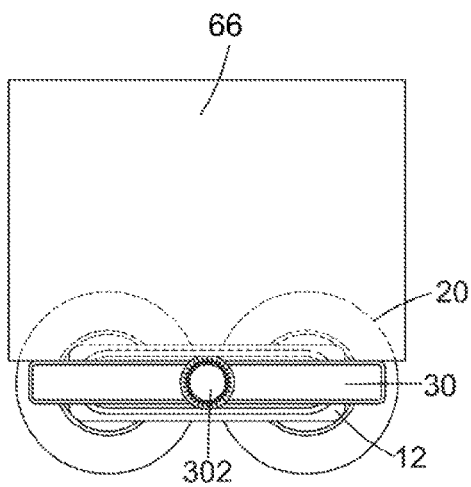
Fig. 1    Fig. 2
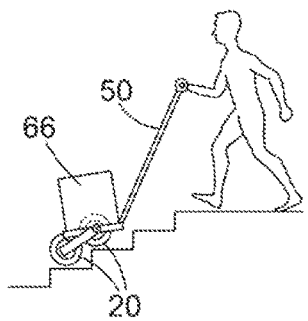
Fig. 3A
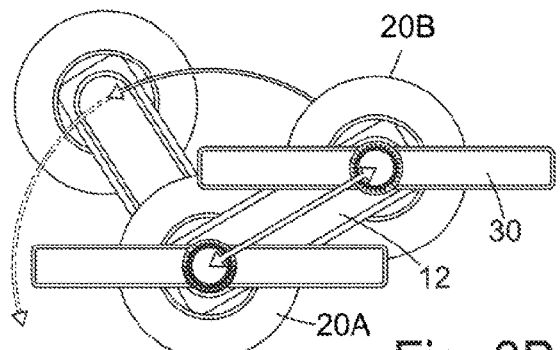
Fig. 3B
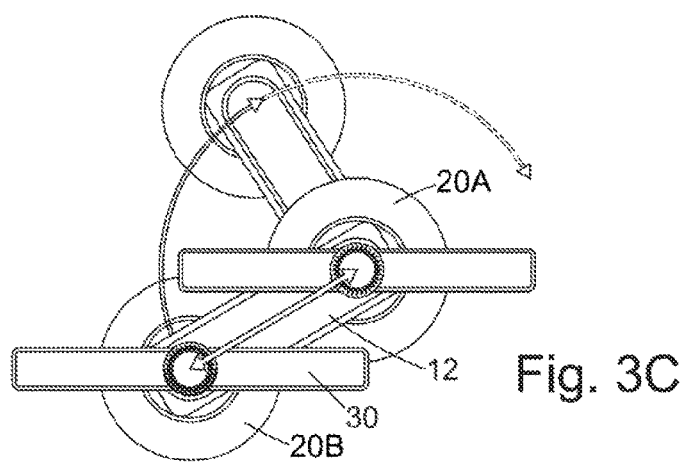
Fig. 3C

WHEELED PERSONAL TRANSPORTATION DEVICE

CROSS-REFERENCE TO RELATED APPLICATIONS

This application claims foreign priority benefits under 35 U.S.C. § 119(a)-(d) to GB Application 1618983.9 filed Nov. 10, 2016, which is hereby incorporated by reference in its entirety.

TECHNICAL FIELD

One of the major drawbacks to most, if not all, forms of public transport is the integration of transport solutions into users' daily lives. It is common for the first and/or final miles of a journey to take a disproportionate amount of time and effort in the context of the overall journey. This is one of the most common reasons given for the use of private transport: that it can provide a truly door to door solution. As a result, there is a clear need for convenient, efficient first/final mile transportation.

BACKGROUND

There are several disparate technologies that provide a partial solution to this problem. Self-balancing single axle devices, such as electric unicycles, Segway® and hoverboards can provide transportation over substantially flat terrain and have a reasonable range, but they are easily stopped by steps, curbs and other street furniture. Furthermore, they are too heavy and bulky for easy stowage and therefore they do not integrate well with other transport solutions as they occupy too much space within a vehicle, if, indeed, they can even be successfully stowed within the vehicle.

There are also two axle systems, which have the potential to be more stable than single axle systems. However, they also fail to address the issue of changes in height at curbs, steps and gaps.

Stair-walkers and other similar three-wheel cluster devices have been developed specifically to deal with stairs. However, they are typically too heavy and bulky for stowage within a vehicle or integration with other transportation solutions.

It is against this background that the present invention has arisen.

SUMMARY

According to a disclosed embodiment of the invention, a device for transporting a payload over a varied terrain is provided. The device comprises a planar platform configured to accommodate the payload and a pair of wheel clusters mounted to the platform at opposite ends thereof. The wheel clusters are powered in both rotation and in translation relative to the platform. Conversely, depending on the assumed frame-of-reference, the platform is powered in both rotation and in translation relative to the wheel clusters. Each of the wheel clusters comprises an arm, and a first and a second wheel rotatably mounted to respective opposite ends of the arm. Each of the wheels is independently powered about its respective axis of rotation.

A plurality of motors is provided to power the rotation and translation of the wheel clusters relative to the platform, and also the rotation of the wheels relative to the arms. The motors may be electric motors housed in or on the platform or wheel clusters. The device further comprises an electronic controller commanding the plurality of motors to enable stable rolling movement of the device over a surface with only one wheel of each cluster in contact with the surface. The independent controllability of each wheel and of the wheel clusters relative to the platform allows the device to steer and to negotiate (ascend and descend) steps.

Regarding the translation of the platform is relative to the wheel clusters, the platform may be positioned anywhere along a continuum defined between a first position substantially aligned with a first wheel in each of the first and second wheel cluster and a second position substantially aligned with a second wheel in each of the first and second wheel cluster.

Within the context of this invention the term "payload" is used to refer to any load to be transported and is intended to include, but not be limited to: the user, another person, one or more animals, an inanimate cargo which could include airport luggage, grocery shopping or any combination of the aforementioned.

Within the context of this invention, the term "varied terrain" is used to refer to every type of pedestrian infrastructure in a range of locations. It is intended to include city street fixtures including curbs, sidewalks, pavements, individual steps up or down, multiple steps up or down, gaps such as those found between the train and the platform edge or any combination of the aforementioned. It is also intended to include tarmac, flagged, gravel, tiled or carpeted surfaces and other similar terrain.

According to a further feature of the disclosed embodiment, the device may comprise at least one sensor detecting an approaching step and providing an input to the controller.

According to a further feature of the disclosed embodiment, the device may comprise at least one sensor operative to detect a leaning motion of a user standing on the platform and provide an input corresponding to the leaning motion to the controller.

The arms of the wheel clusters may be oriented substantially vertically while the platform remains substantially horizontal. The platform may then translate relative to the arms, moving upward (in the vertical plane), and this combined with the rotation of the platform with respect to the arms enables smooth transitions across gaps and up/down curbs, thereby achieving integration with all aspects of pedestrian infrastructure.

The ability of the platform to be located at any point on the continuum between the two listed extremes enables the platform to be located half way between the extremes in order to provide a stable, four-wheeled load carrying configuration.

The plane of the first wheel cluster is substantially parallel to the plane of the second wheel cluster. The plane of the platform is substantially orthogonal to the planes of the first and second wheel clusters.

The distance between the centers of the two wheels in each cluster may be greater than the sum of the radii of the two wheels. If this were not the case, then the wheels would overlap and interfere with one another.

The distance between the two wheels centers in each cluster may be greater than the height of a curb that the device is expected to climb. This ensures that the center of the top wheel can rise above the curb and facilitate the transfer of weight onto the curb.

The device may further comprise one or more motors configured to power the translating mechanism of the platform relative to the wheels. The device may further comprise one or more additional motors configured to power the rotation of the wheel clusters relative to the platform. The device may further comprise a motor provided in the hub of each wheel. This enables the wheels to be independently driven.

In some embodiments, the provision of a motor configured to power the rotation of the wheel clusters relative to the platform enables center of gravity (CoG) balancing on substantially flat even ground. In this scenario, the default orientation of the platform is substantially horizontal. Balancing occurs by minute variations of speed of driven wheels. If the payload were to lose balance forwards then the device below the payload accelerates to re-center the payload center of gravity between the two axles linking wheels in contact with the ground at that point.

The device may further comprise at least one sensor operative to detect upward and/or downward steps which the device is approaching. The sensor may advantageously be an ultrasound device or an optical sensor (camera).

All four wheels, i.e. both wheels in each of the two-wheel clusters may be configured to contact the ground simultaneously to enable loading of the payload. With all four wheels simultaneously in contact with the ground, the device is stable. This enables the user to stand in a stable condition on the device, prior to commencing transportation.

The device may further comprise a control system. The control system may include a user interface to enable the user to register the requirement to step up or down. The control system is further configured to control the motors in response to data from the sensors in order to achieve smooth transportation of the payload.

When the user mounts the device, or an inanimate payload is loaded on to the device, the device is preferably configured in its most stable configuration, namely with all four wheels in contact with the ground. This de-skills the mounting of the device for the user and provides a stable platform for an inanimate payload. In order to commence transportation, the control system then drives the platform towards either the front or the rear wheel cluster. Once the rotation axle of the platform is perfectly coincident and coaxial with the axis projected through the wheel from each cluster to which it was driven, then the platform rotation motor rotates the wheel clusters by 90 degrees and thereby lifts one wheel in each wheel cluster in a rotating motion until they are above the other wheel in each cluster.

The invention will now be further and more particularly described, by way of example only, and with reference to the accompanying drawings, in which:

BRIEF DESCRIPTION OF THE DRAWINGS

FIG. 1 shows a two-wheel cluster configuration of the device with the platform in the lower position for normal driving on substantially flat ground;

FIG. 2 shows the two-wheel cluster configuration of the device configured to carry an inanimate payload on a substantially flat surface;

FIG. 3A to 3C show the two-wheel cluster configuration climbing and descending steps;

DETAILED DESCRIPTION

Figure 4A:
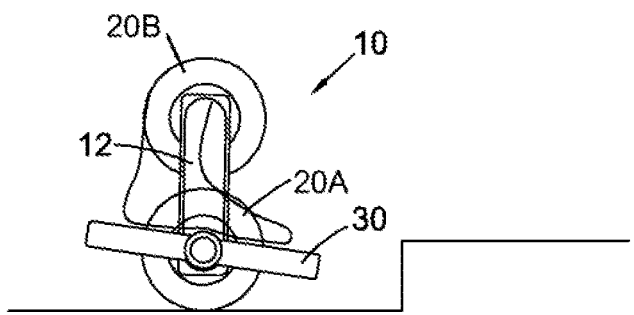
FIGS. 4A to 4G show various steps in the sequence of the two-wheel cluster configuration climbing steps.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a two-wheel cluster configuration of a device 10. The device 10 comprises a first cluster comprising two wheels 20A, 20B mounted to a first link arm 12 (visible in FIG. 1) and a second cluster comprising two wheels 20A, 20B mounted to a second link arm 12. FIGS. 1-5 depict only the two-wheel cluster attached to the end of the platform 30 nearest to the viewer, and it is to be understood that a second two-wheel cluster is generally identical to that shown and is attached to the opposite/far end of the platform 30, to create a four-wheeled device 10. Each wheel 20A, 20B is provided with an electric motor which powers the wheel in rotation relative to the link arm 12, as described in greater detail hereinbelow.

The device 10 also comprises a platform 30 on which a payload is carried during use. The platform 30 has a generally flat upper surface which defines a payload-carrying plane which is maintained in a generally horizontal orientation during use of the device 10. The platform 30 is provided with a rotation mechanism 302 and force breakaway ratchet 304 to permit angular displacement between the link arm 12 and the platform 30 caused by sudden high torque. The link arm 12 is further provided with a belt-driven translating arrangement to enable the movement of the platform 30 along the length of the link arm 12.

FIG. 1 shows the device 10 is the normal driving condition on substantially flat ground with an animate payload, typically a person, with the platform 30 aligned with the lower wheels 20A. This configuration provides greater stability and feeling of safety for the user.

Figure 4B:
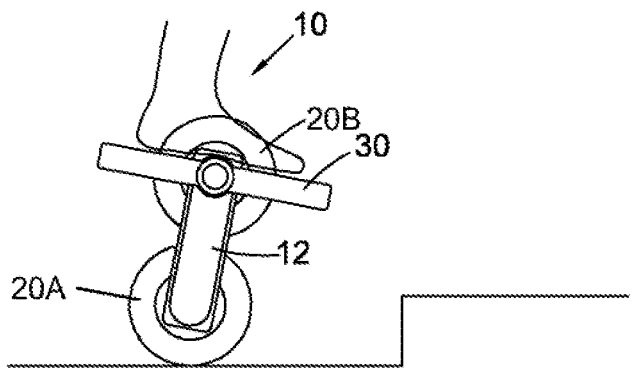

It is also possible for the device 10 to be configured such that the normal driving condition is inverted so that the platform 30 is aligned with the upper set of wheels 20, as shown in FIG. 4B. This configuration enables the device 10 to step up (see FIGS. 4C-4F) without preparation, but it may require the user to be more confident and the balancing system to be configured to react in shorter time intervals and with higher power. These adaptations are required because the out of balance forces will be much greater if the normal driving position is high because the platform on which the load rests has a long lever which will increase the moment about the contact patch on the wheel on the ground by the ratio (L+r)/r.

FIG. 2 shows a two-wheeled configuration of the device 10 configured to carry a payload over a substantially flat surface. The payload may be inanimate, although this configuration can also be used for a human passenger depending on the driver's usage choice. This configuration may be appropriate for a human payload if stability is a priority rather than speed or distance. The platform 30 is positioned at the mid-point of the link arm 12 and rotated to be substantially parallel with the link arm 12 so that all four of the wheels 20 are in contact with the ground. An inanimate payload 66 is positioned on the device 10.

FIGS. 3A to 3C show the two-wheeled configuration of the device 10 carrying loads up and down stairs. This action is aided by a lever 50, shown in FIG. 3A. The lever 50 enables the device 10 to operate in a semi-autonomous mode so that the user can guide the device 10 without having to bear the weight of the payload 66 at any time.

FIG. 3B shows the device travelling from right-to-left and downward to descend a step or a set of stairs. The platform 30 has translated along the link arm 12 (to the left as viewed in FIG. 3B) towards the leading/lower wheel 20A, and the trailing/upper wheel 20B is then rotated counterclockwise about the axis of wheel 20A to contact the lower step and become the new leading/lower wheel. The platform 30 then continues to translate in a leftwards and downwards direction, this time traveling the other way along the link arm 12, towards wheel 20B again (which is now the leading wheel). By repeating this sequence, the device 10 moves down the steps.

FIG. 3C shows the device 10 travelling from left-to-right and upward to ascend a step or a set of stairs. The platform 30 has translated along the link arm 12 (to the right as viewed in FIG. 3C) towards the leading/upper wheel 20A, and the trailing/lower wheel 20B is then rotated clockwise about the axis of wheel 20A to contact the upper step and become the new leading/upper wheel. The platform 30 then continues to translate in a rightward and upward direction along the link arm 12, towards wheel 20B again (which is now the leading wheel). By repeating this sequence, the device 10 moves up the steps.

FIGS. 4A to 4G show the various stages of the step climbing operation for the two-wheel cluster device 10. In some embodiments, the illustrated steps are initiated solely in response to a sensor mounted to the device 10 (as described further hereinbelow) identifying the requirement for the device to step up. In some embodiments, a user interface may be provided such that the user can initiate a step climbing procedure.

The device 10 is configured to undertake normal driving with the platform 30 low, preferably in line with the lower set of wheels 20A as illustrated in FIG. 4A. When the device detects that it is approaching a step up, the platform 30 is elevated into line with the upper wheels 20B. FIG. 4B shows the user driving the device 10 forward towards the step up. The platform 30 is tilted from the horizontal position so that the leading edge of the platform is below the trailing edge. This results in the lower wheels being powered forward by the motors provided within the hubs.

In some embodiments, the platform may be provided with two pressure pads. These are configured to enable the device to steer left and right. The user will apply an increased pressure to one of the two pads in preference to the other in order to guide the device around a corner. This pressure differential will be communicated from the pressure pads on the platform, through the control system and the turning of the device will be realized by increasing the torque provided by the hub motor in the wheels on the outside of the corner. For example, if the user applies an increased pressure on the left pressure pad, then the wheels from the right wheel cluster that are in contact with the ground will accelerate to drive the device around the corner.

In some embodiments, the platform may be split into two sections that are articulated such that the differential pressure provided by a user signaling an intent to turn a corner results in a physical depression of one of the sections of the platform relative to the other. This height difference, of either the entire side of the platform, or the leading edge thereof, will be interpreted by the control system as requiring a differential torque between the wheels in order to drive the device around the corner.

Figure 4C:
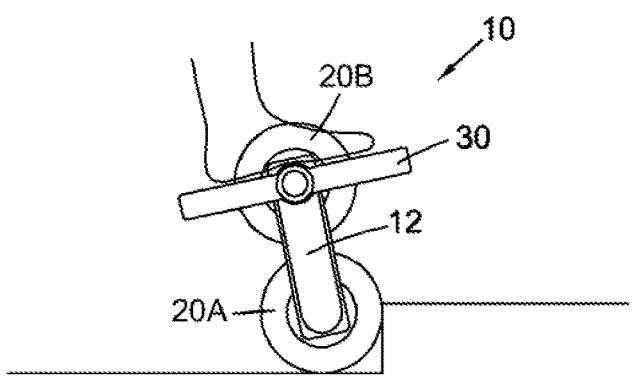

As shown in FIG. 4C, the user leans back to control the device 10 to slow down as the device 10 approaches the curb or other step up. Although this illustration shows the device 10 climbing a single step, it will be apparent that the sequence would be equally applicable to a series of steps. As the lower wheel 20A of the device 10 hits the riser of the step, the lower wheel stops instantaneously. The kinetic energy of the device and payload provides forward momentum which in turn creates rotation about the axle of the lower wheel 20A. Because user control is slowing the device down, there is reverse torque on the lower wheel 20A. When this wheel is stopped by the curb, and power is not instantly cut to the wheel, then the reverse torque rotates the link arm 12 and platform 30 forwards aiding the progress of the upper wheels 20B and payload to continue in the forward direction.

Figure 4D:
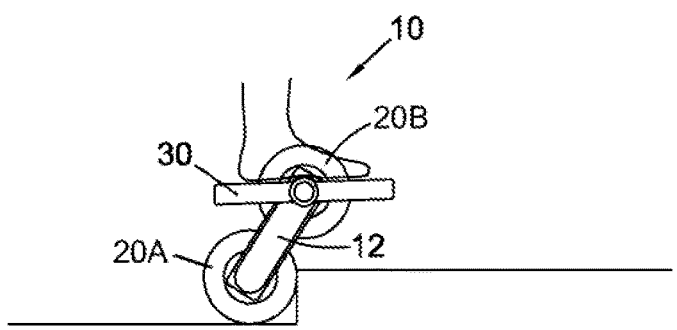

The force on the link arm 12 creates a torque against the platform 30 which is held substantially level by the user's mass and balance on his/her feet, causing a break-away feature or controlled release of angular connection between link arm 12 and the platform 30. As shown in FIG. 4D, the user's momentum and mass now effectively let him rotate forwards (clockwise about the axis of the trailing/lower wheel) along with the platform 30.

Figure 4E:
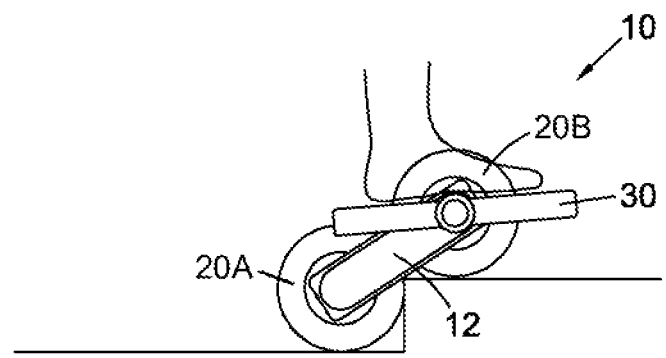

As soon as the upper wheel 20B hits the raised surface as shown in FIG. 4E, the moment of the platform 30 is arrested and the remaining momentum of the user causes him to lean forwards on the platform 30, providing control input for forward propulsion to both wheels 20A, 20B in each cluster, i.e. to all four of the wheels that are powered at the point illustrated in FIG. 4E. All of the weight of the payload is on the front wheel 20B, the link arm 12 is still disconnected from the platform and the device 10 drives on, dragging the (also powered) lower wheel 20A up the curb. At this point, the device 10 is balancing on only the front wheels 20B as if the rear wheels 20A did not exist as the link arm 12 is still free to rotate relative to the platform 30.

Figure 4F:
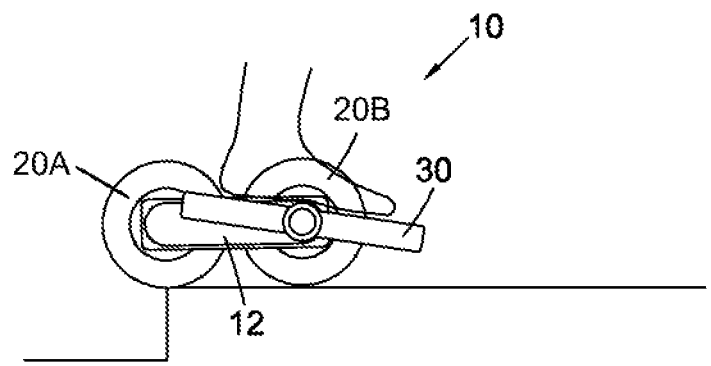
Figure 4G:
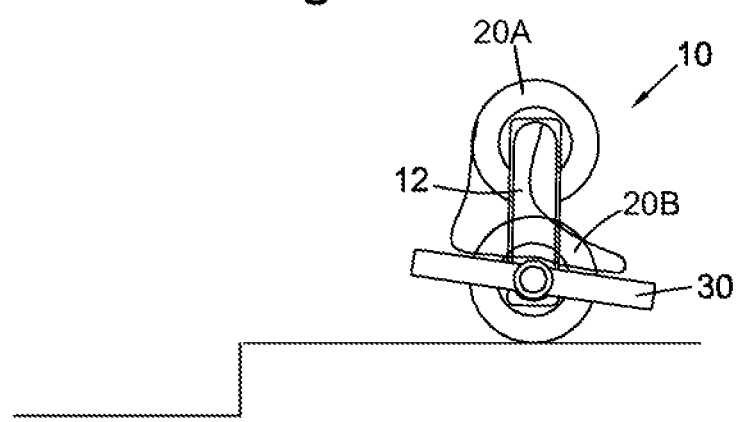

As soon as the control system detects the following wheel 20A is on the same surface as the front wheel 20B as illustrated in FIG. 4F, the control system instructs the link arms 12 to be powered forwards in a clockwise manner relative to the platform 30. The unloaded wheels 20A move up until the link arm 12 is generally perpendicular to the platform 30 again as shown in FIG. 4G. Once the position illustrated in FIG. 4G is reached, the platform 30 and link arm 12 lock their rotational joint again. The step climbing sequence is completed for the configuration in which the normal running position is with the platform 30 in line with the lower wheels (now 20B).

In some embodiments, where there is no ratchet or clutch disconnect, the rotational joint will not be locked again because the rotation of the link arm 12 relative to the platform 30 is controlled by drive and force sensors. In such an embodiment, the motor controlling the rotation of the platform relative to the link arm 12 arrests the rotation when the platform is in one of four predetermined preferred drive configurations, which are defined to be 0°, 90°, 180° and 270° where, 0° and 180° are the horizontal four-wheel drive modes (depicted in FIG. 2).

If the desired or default running position is with the platform 30 in line with the upper wheels, the belt drive translates the platform 30 back up to the upper wheel center as illustrated in FIG. 4B.

FIGS. 5A to 5D illustrate the various stages in the descent of a step by the two-wheel cluster configuration. The kinematics for approaching a step down are inversed relative to the step-up procedure described above with reference to FIGS. 4A to 4G.

In some embodiments, the illustrated sequence may be initiated solely in response to a sensor 42 identifying the requirement for the device to step down (or up). In some embodiments, a user interface may be provided to allow the user to initiate the step climbing or descending sequence.

Figure 5A:
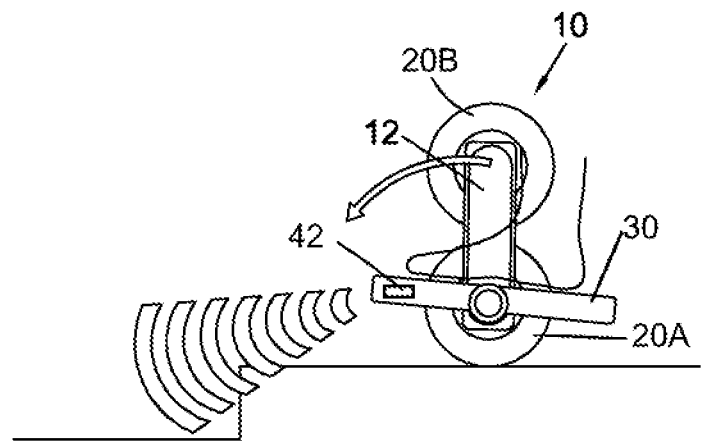
FIGS. 5A to 5D show various steps in the sequence of the two-wheel cluster configuration descending steps.
Figure 5B:
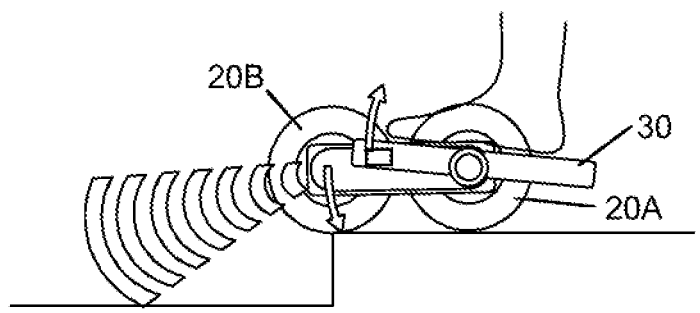

If the riding position is high (as in FIG. 4B) when approaching the obstacle, then before reaching the curb or step down the platform 30 is lowered to the axle of the lower wheel 20A so that the device is configured as illustrated in FIG. 5A. If the riding position is low, then FIG. 5A illustrates the normal driving position and the step descending operation is commenced by the rotation of the link arm 12 with the free raised wheels 20B forwards till they contact the ground to run ahead of the loaded lower wheels 20A, which are now in a rearward position relative to the unloaded wheels 20B. This condition is illustrated in FIG. 5B. The control system detects that the front wheels 20B are now in contact with the floor, but continues to provide downward force on the link arm 12 pushing the front wheel 20B against the floor.

Figure 5C:
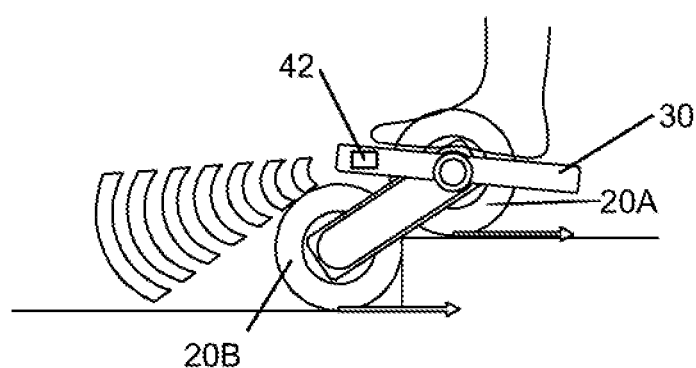
Figure 5D:
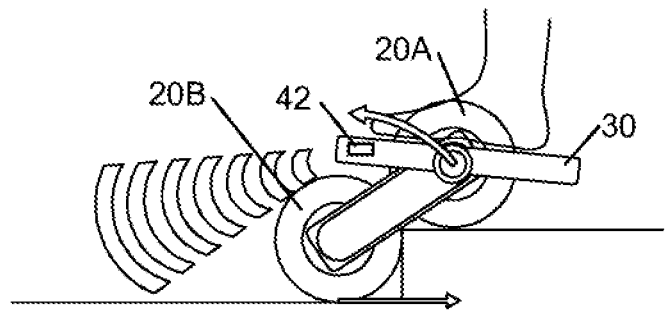

As soon as the system detects that the front wheel 20B has contacted the lower level as illustrated in FIG. 5C, the controller briefly brakes all wheels 20A, 20B to retard the forward motion of the device 10. The detection that the front wheel 20B has contacted the lower level may be achieved by detecting that the rotation of the link arm 12 has ceased or by an accelerometer placed at each extreme of the link arm, which will detect when the downward motion of the forwards extreme of the link is abruptly stopped. The braking force on the front/lower wheel 20B creates an opposite rotational force on the link arm 12, moving the platform 30 forwards and upwards. This motion is matched by the forwards momentum of the user, with the platform pressing upwards against the user, lifting them upwards. This motion is indicated by the arcing arrow in FIG. 5D. The free motion of the user, applied against the braked motion of the device 10 results in the user leaning forwards on the device 10 and the controller releasing the brakes on the lower wheel 20B to start re-balancing the user on the device 10.

If the device is configured for normal running with the platform 30 in line with the lower pair of wheels (now 20B), then once the user is rebalanced on the platform 30, the belt drive will power the platform 30 down the link arm 12 until it is level with the lower pair of wheels 20B.

In the embodiment of FIGS. 1-5, it may be seen that the movement of the platform in the vertical plane combined with the rotation of the platform with respect to the wheel clusters enables smooth transitions across gaps and up/down curbs, thereby achieving integration with all aspects of pedestrian infrastructure.

Also in the above embodiment, the ability of the platform to be located at any point on the continuum between the two listed extremes enables the platform to be located half way between the extremes in order to provide a stable, four-wheeled load carrying configuration.

Also in the above embodiment, the plane of the first wheel cluster is substantially parallel to the plane of the second wheel cluster. The plane of the platform is substantially orthogonal to the planes of the first and second wheel clusters. The distance between the centers of the two wheels in each cluster may be greater than the sum of the radii of the two wheels. If this were not the case, then the wheels would overlap and interfere with one another. The distance between the two wheels centers in each cluster may be greater than the height of a curb that the device is expected to climb. This ensures that the center of the top wheel can rise above the curb and facilitate the transfer of weight onto the curb.

The FIG. 1-5 device may comprise one or more motors configured to power the translating mechanism of the platform relative to the wheels. The device may further comprise one or more additional motors configured to power the rotation of the wheel clusters relative to the platform. The device may further comprise a motor provided in the hub of each wheel. This enables the wheels to be independently driven.

In some embodiments of the above device, the provision of a motor configured to power the rotation of the wheel clusters relative to the platform enables center of gravity (CoG) balancing on substantially flat even ground. In this scenario, the default orientation of the platform is substantially horizontal. Balancing occurs by minute variations of speed of driven wheels. If the payload were to lose balance forwards then the device below the payload accelerates to re-center the payload CoG between the two axles linking wheels in contact with the ground at that point.

As discussed above, the device may comprise a sensor to detect upward steps. This detection would be required in the circumstances where the device is configured to ride with the platform low and then to anticipate an upward step by raising the platform. This configuration has the advantage of increased stability, control and feeling of safety for the rider. The device may further comprise a sensor to detect downward steps. The sensor may be an ultrasound device or a camera.

All four wheels, i.e. both wheels in each of the two-wheel clusters, may be configured to contact the ground simultaneously to enable loading of the payload. With all four wheels simultaneously in contact with the ground, the device is stable. This enables the user to stand in a stable condition on the device, prior to commencing transportation.

As discussed above, the device may comprise a control system. The control system may include a user interface to enable the user to register the requirement to step up or down. The control system is further configured to control the motors in response to data from the sensors in order to achieve smooth transportation of the payload.

When the user mounts the device, or an inanimate payload is loaded on to the device, the device is preferably configured in its most stable configuration, namely with all four wheels in contact with the ground. This de-skills the mounting of the device for the user and provides a stable platform for an inanimate payload. In order to commence transportation, the control system then drives the platform towards either the front or the rear wheel cluster. Once the rotation axle of the platform is perfectly coincident and coaxial with the axis projected through the wheel from each cluster to which it was driven, then the platform rotation motor rotates the wheel clusters by 90 degrees and thereby lifts one wheel in each wheel cluster in a rotating motion until they are above the other wheel in each cluster.

Figure 6:
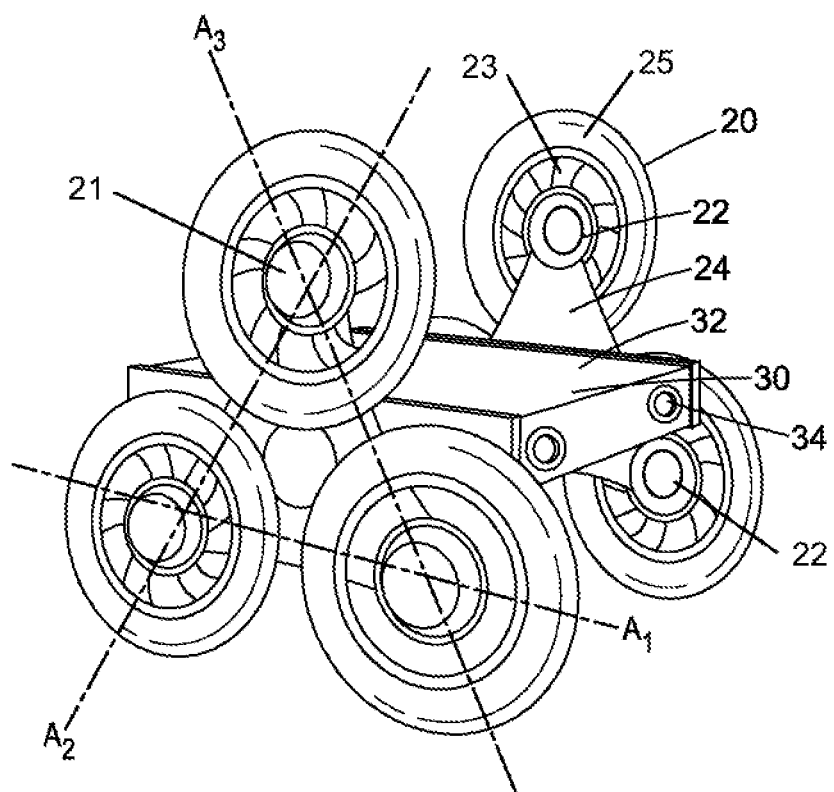
FIG. 6 shows a three-wheel cluster configuration.

FIG. 6 shows an embodiment of device 10 having a three-wheel cluster configuration. There are six drive wheels 20 formed in two clusters, each cluster having three wheels. Each wheel has a hub 21, a plurality of spokes 23 and a tire 25. The number of spokes is selected to balance the requirement for strength with the requirement that the device is sufficiently light to be handled with ease. The tire 25 may be fabricated from rubber or plastic and is preferably provided with a tread pattern to ensure that the tires 25 do not slip on wet surfaces. The tire may also be pneumatic and may therefore also include an inner tube (not shown).

The upper surface of the platform 30 may have a non-slip surface 32. The platform 30 may also be provided with lights 34 which ensure that the device is visible to other users of the pavement, sidewalk, train station or wherever else the device is deployed, but additionally, the lights 34 enable a user riding the device 10 in the hours of darkness to see clearly what is directly ahead of the device 10.

Each of the six wheels 20 is provided with a drive wheel motor 22 located in hub 21. All six of these motors 22 are independently controlled. This ensures that power is only provided to those wheels 20 in contact with the ground at any one time. This provides a steering capability by feeding more power to the wheels at one side of the device than to those at the other side of the device, thereby causing the device to turn.

Figure 7A:
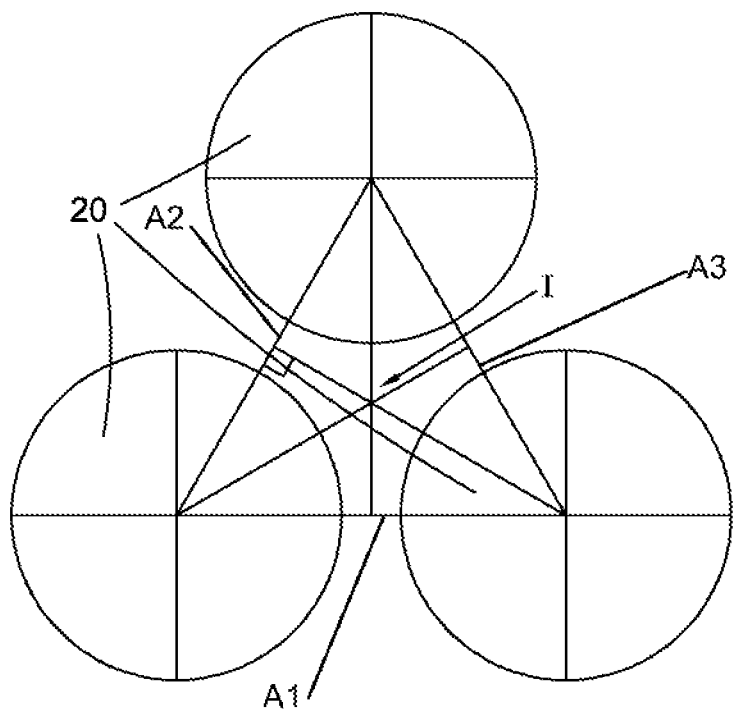
FIGS. 7A to 7E show details of wheel configurations for a three-wheel cluster configuration.

Each cluster is provided with a wheel carrier 24 which is configured to interconnect the three wheels of each cluster. The wheel carrier 24 may advantageously be an equilateral triangle. The wheel carrier 24 holds the three wheels of the cluster in fixed relative position. The wheel carrier 24 also provides conduit for communication with and supply of power to the wheels 20. The wheel carrier 24 effectively defines three wheel axes $A_1$, $A_2$, $A_3$ between adjacent wheels, as illustrated in FIGS. 6 and 7A. The three wheels 20 in each cluster are preferably equidistant from one another. The cluster rotation axis is at the intersection I of the three perpendicular lines bisecting each of the connecting lines between pairs of adjacent wheel centers.

The relationship between the size of the wheel carrier 24 and the radius of the wheels 20 is set out in FIGS. 7B through 7E. Although each of these figures shows two wheels only, it will be understood that these could be two wheels that form part of a three-wheel cluster. In the three-wheel embodiment, the third wheel would be located at the position indicated in phantom lines at 20' in FIG. 7B. The third wheel is omitted entirely from FIGS. 7C-7E for clarity of illustration.

Figure 7B:
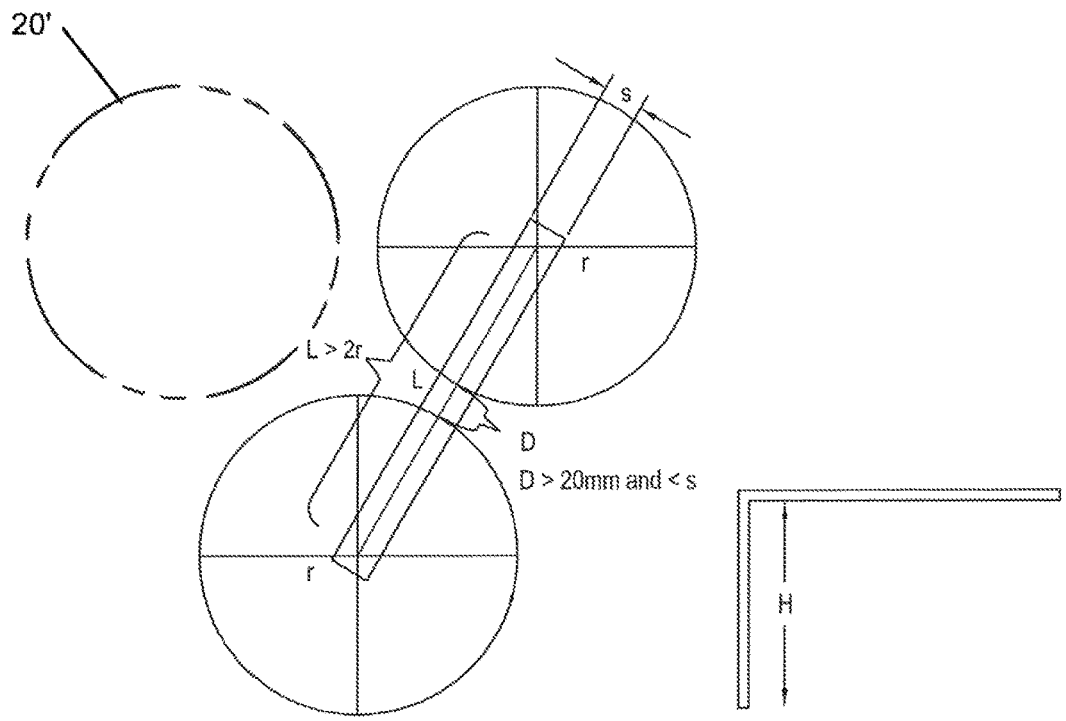

FIG. 7B illustrates the relationship between the wheel radius r, the axle pitch L, the wheel gap D and the width, S, of the platform 30. These factors, together with the height of the curb, H, all contribute to the optimization of the configuration of the device. Curbs typically have a height of 200 mm or less. Therefore, in some embodiments, the following proportions are deployed:

150 mm>r>H/1.75

L>2r

S<r/2

20 mm<D<S

In some embodiments r may be between 115 mm and 150 mm; L may exceed 230 mm; S may be within the range 50 mm to 75 mm; and D may be within the range 20 mm to 75 mm.

Figure 7C:
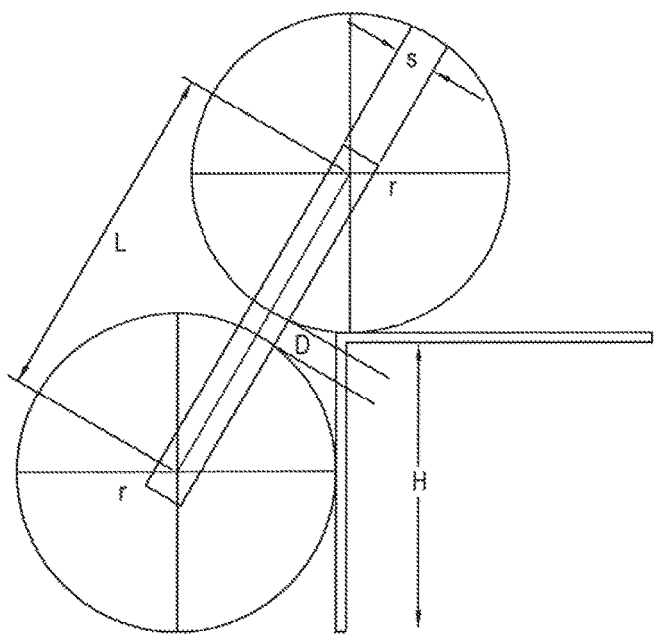

FIG. 7C illustrates in further detail the design constraint that L must exceed H. The center of the leading/upper wheel must land on the top of the curb as illustrated in FIG. 7C, otherwise the device may fail to climb the curb and may slip down again. In order to ensure effectively curb climbing L, which is the sum of the wheel diameter 2R and the wheel gap D, must exceed the height H of the curb.

Figure 7D:
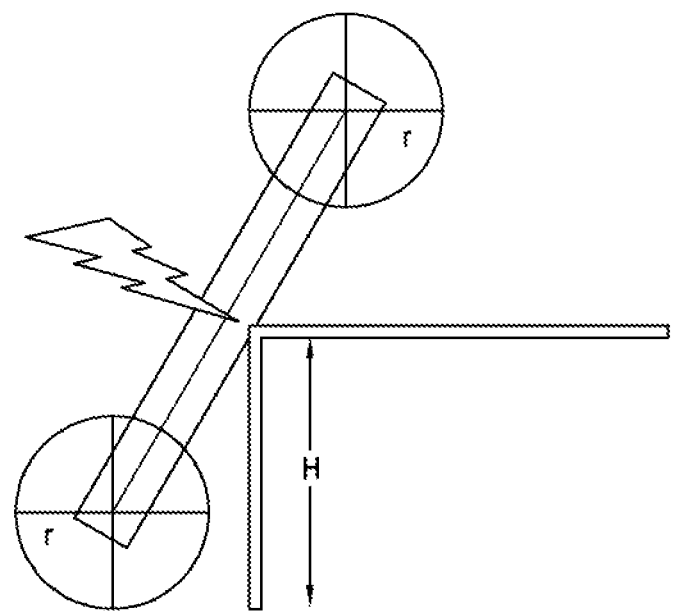
Figure 7E:
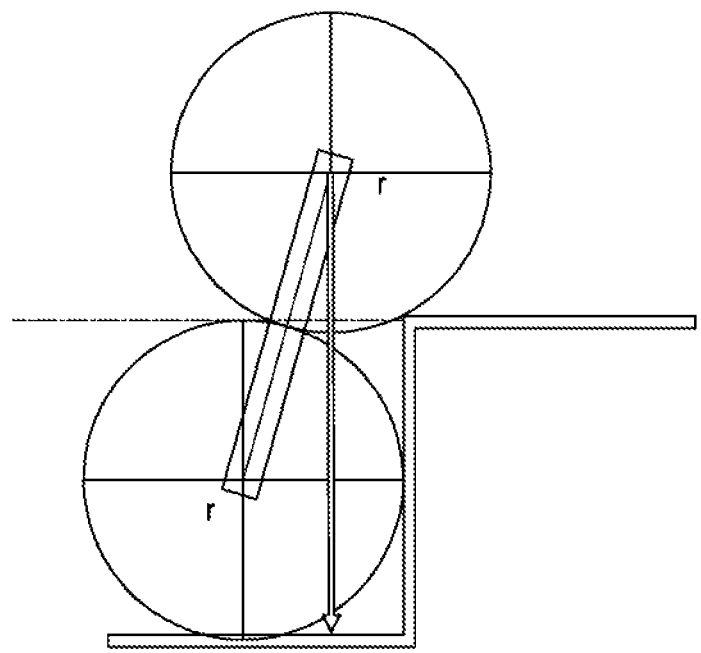

FIGS. 7D and 7E illustrate two extreme configurations that would not be effective. As illustrated in FIG. 7D, the radius r of the wheels is too small and therefore the platform contacts the curb edge, preventing a smooth curb climbing operation. As illustrated in FIG. 7E, the axle pitch L is only equal to the wheel diameter 2r, which is also equal to the curb height H. The upper wheel therefore cannot effectively land on the curb and the device cannot climb the curb. Furthermore, the wheels within each cluster will interfere with one another because L does not exceed 2r and therefore a device thus configured would not be operable.

The device 10 may comprise a control and sensing system operative to rotate forward and place the redundant wheels (those not initially in contact with the ground surface) in front of the obstacle when descending a step. The sensing system may further comprise an acceleration sensor or accelerometer. This would be configured such that when the device comes into contact with a curb it records a high 'g' deceleration, for example when the device is climbing a step. The sensing system will further comprise a controller programmed to initiate a curb-climbing sequence when the acceleration sensor registers a value of accelerating exceeding a predetermined value. The predetermined value may be 0.2 g or 2 $m/s^2$.

The sensing system may be further configured to sense when the redundant wheel hits the ground, signaling a return to even ground drive parameters.

As seen in the embodiment disclosed in FIGS. 6 and 7, the plane of the first wheel cluster may be substantially parallel to the plane of the second wheel cluster. The plane of the platform may be substantially orthogonal to the planes of the first and second wheel clusters.

As described in relation to the embodiment disclosed in FIGS. 6 and 7, each wheel may be independently driven and this independent drive may be achieved through a motor provided in the wheel hub. This ensures that the wheel from each cluster that is not in contact with the ground does not rotate aimlessly. It also allows differential wheel speeds enabling effective cornering and climbing.

As described in relation to the embodiment disclosed in FIGS. 6 and 7, the platform may be controlled in a manner to ensure that it remains substantially level/horizontal when negotiating (climbing and/or descending) one or more steps. This is enabled by the independently driven aspect of the platform as described above. The wheels clusters may be commanded to create angular rotation of the wheel clusters with respect to the orientation of the platform.

As described in relation to the embodiment disclosed in FIGS. 6 and 7, the first and second wheel clusters may be configured and controlled so that there are four wheels in contact with the ground during normal running. In this context, the term normal running is used to denote the majority of activity covering substantially even ground. It includes any activity which is not a height transition or curb climbing maneuver.

As described in relation to the embodiment disclosed in FIGS. 6 and 7, the platform may be capable of rotation relative to the axle joining the first and second three-wheel clusters in order to achieve the step climbing capability of the device. Because the platform can rotate relative to the axle joining the three-wheel clusters, when the forward most wheel of each cluster hits an upward step or curb, the kinetic energy of the payload initiates a rotation about the front wheel axis.

As described in relation to the embodiment disclosed in FIGS. 6 and 7, the rotation of the platform relative to the axis joining the first and second three-wheel clusters may be powered. The provision of a platform capable of powered rotation relative to the axle joining the first and second wheel clusters enables many of the key aspects of the design to be realized. In some embodiments, the device may be configured such that there is a default orientation for the platform that is parallel to a line connecting the wheel centers of the two wheels from each cluster that are in contact with the ground. In these embodiments, there are three preferred orientations, separated by 120°, depending upon which two wheels of each cluster are contacting the ground. The provision of powered rotation of the platform relative to the wheel clusters ensures that the platform will settle correctly into whichever one of the three preferred orientations is the closest be being horizontal following a step-up or step-down operation.

Referring now to FIGS. 8A-8F, the device 10 further includes a platform 30 which is hollow and configured to contain elements of a control system and battery and also to keep overall device weight to a minimum. A pair of quick-release/connect latches 36 attach the platform 30 to the wheel carriers 24 (or to the link arms 12 in the case of the FIG. 1-5 four-wheeled embodiment). The term "quick-release/connect latch" is understood to describe any mechanical latch having a configuration which allows a user to quickly and easily actuate the latch by hand (without the need to utilize any type of tool) to both engage and disengage the latch.

FIGS. 8A to 8F show only the wheel cluster which attaches to a first end of the platform 30, with the second wheel cluster (which attaches to the opposite second end of the platform) being omitted for clarity. It will be understood that the latch mechanism is preferably replicated on the second wheel cluster. The platform 30 is provided with motors 37 to drive the rotation of the platform relative to the wheel carriers 24. Although two separate motors 37 are provided on the illustrated example, the device 10 could be provided with a single motor 37 having two independent drive shafts. The platform 30 is provided with a matched pair of drive shafts 35 that are driven by the respective motors 37. In the depicted embodiment, drive shafts 35 are internally fluted and define latching cavities 38.

In order to interface with these latching cavities 38, the wheel carriers 24 are provided with a retaining guide cap 27 adapted to extend into and latchingly engage with the latching cavity 38. Once the guide cap 27 has entered the cavity 38 it is held in place by locking wedges 28. The locking wedges 28 are configured to depress when they come into contact with the front face of the drive shaft 35 after the retaining guide cap 27 has passed into the hollow shaft, and then to spring radially outward once in position within the cavity 38. The wheel carrier 24 is also provided with an externally fluted stub axle 29 which interfaces with an internally fluted drive shaft 35 provided on the platform 30.

In order to release the wheel cluster from the platform 30, the wheel carrier 24 is provided with a release button 26 which takes the form of a pull tab provided on a continuous internal bar linking through to the retaining guide cap 27.

Figure 8A:
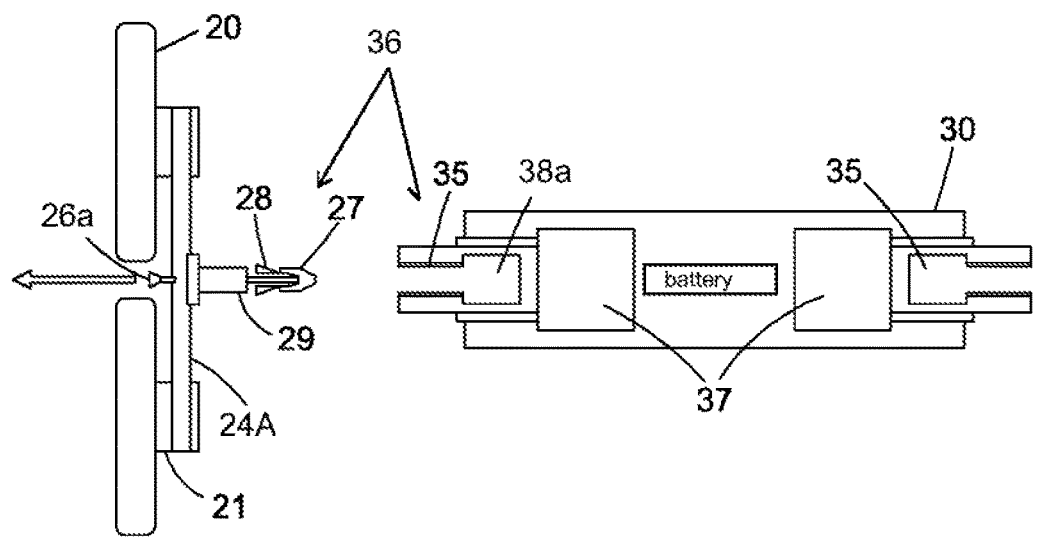
FIGS. 8A to 8F shows examples of the connection between the three-wheel cluster and the platform.

FIG. 8A shows an internally sprung chamfered cavity 38. The release button 26 is provided on the wheel carrier 24 between the wheels so that the user can access it from the outer side of the device, away from the platform 30.

Figure 8B:
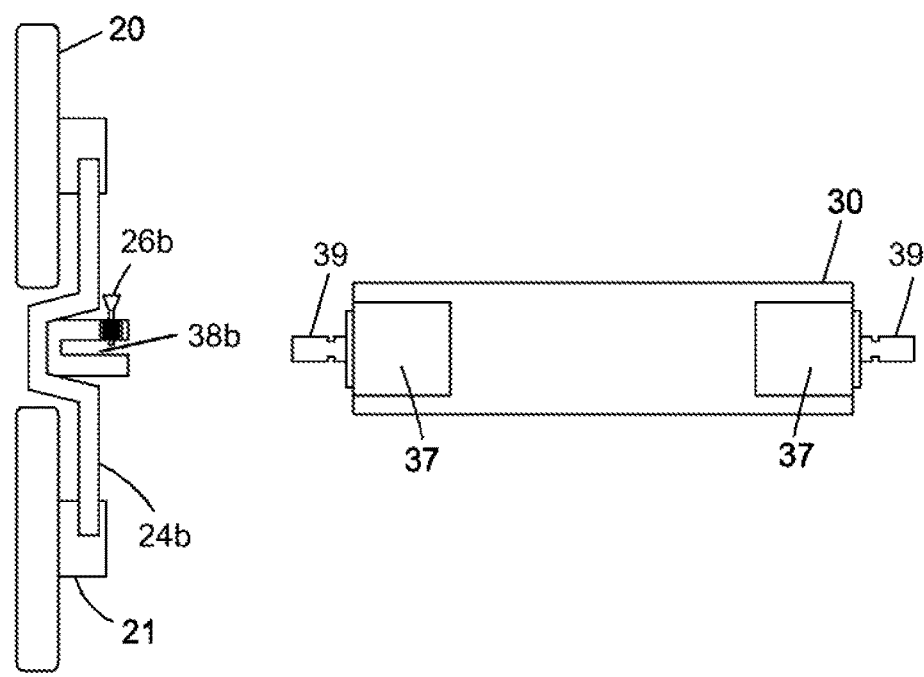
Figure 8C:
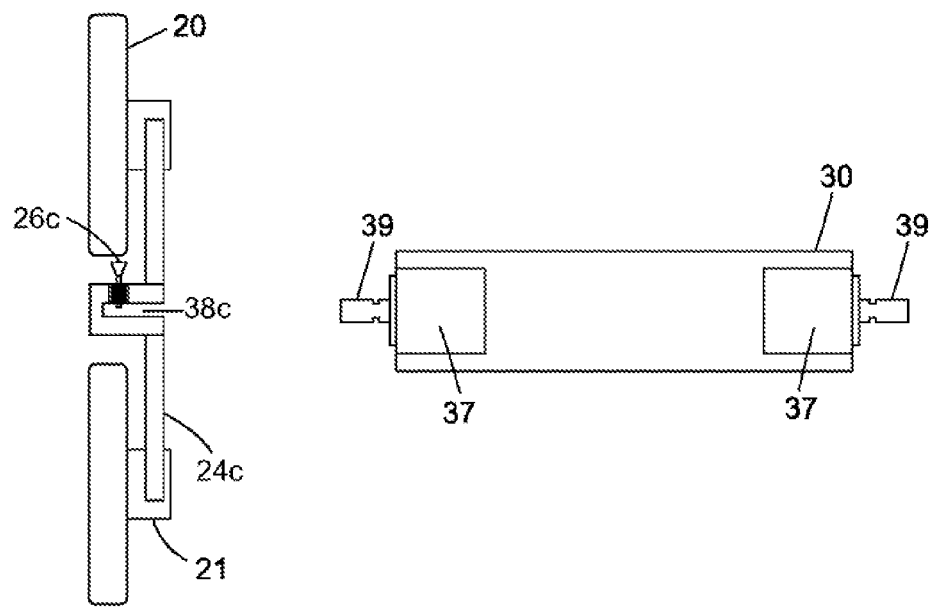

FIGS. 8B and 8C show possible alternative embodiments having the respective release buttons 26b, 26c and latching cavities 38b, 38c provided on the wheel carrier 24b, 24c. In FIG. 8B the wheel carrier 24b is recessed to accommodate the cavity 38b. In FIG. 8C the wheel carrier 24c is substantially planar so that the cavity 38c protrudes from the wheel cluster. A sprung peg 39 protrudes from the platform 30. The disconnection between the wheel carrier 24 and the platform 30 is effected by pulling on the button 26 to disengage it from the sprung peg 39 so that the sprung peg may then be withdrawn from the cavity 38.

Figure 8D:
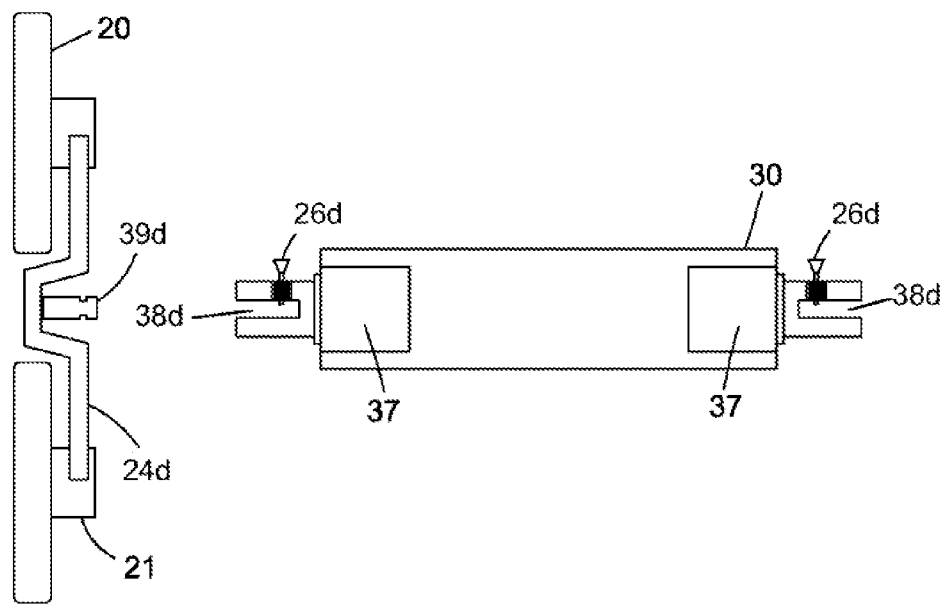

FIG. 8D shows the release buttons 26d provided on the platform 30 adjacent to the cavity 38d, with the sprung peg 39d provided on the wheel carrier 24d. The release button 26d is pulled to release the wheel carrier 24d from the platform 30.

Figure 8E:
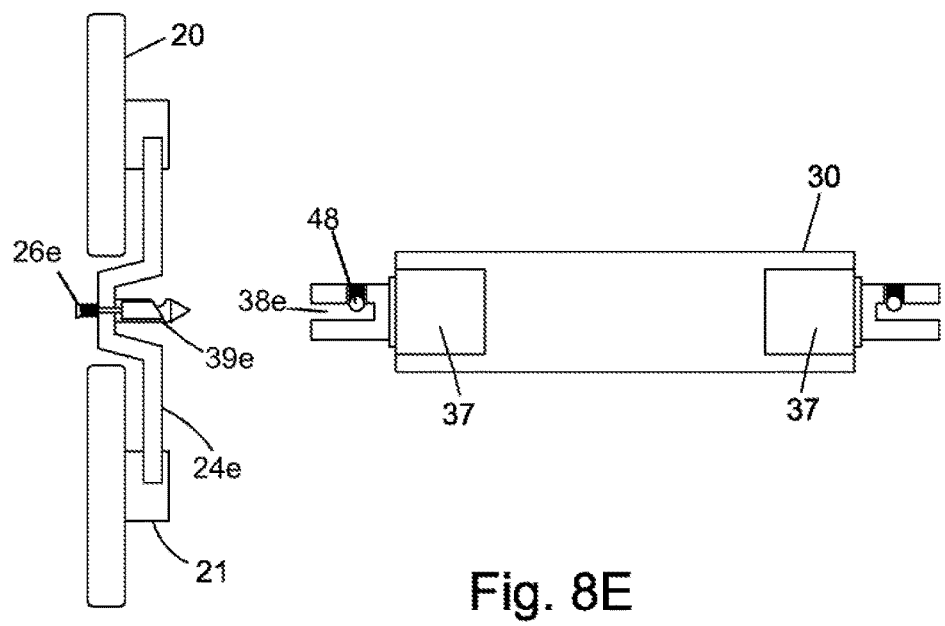

FIG. 8E shows the release button 26e embodied as a plunger which is provided co-axially with the platform 30. When the release button 26e is depressed, it causes the wheel carrier 24e to be separated from the platform 30. In order to affect this disconnection, the platform 30 is provided with sprung ball bearings 48.

Figure 8F:
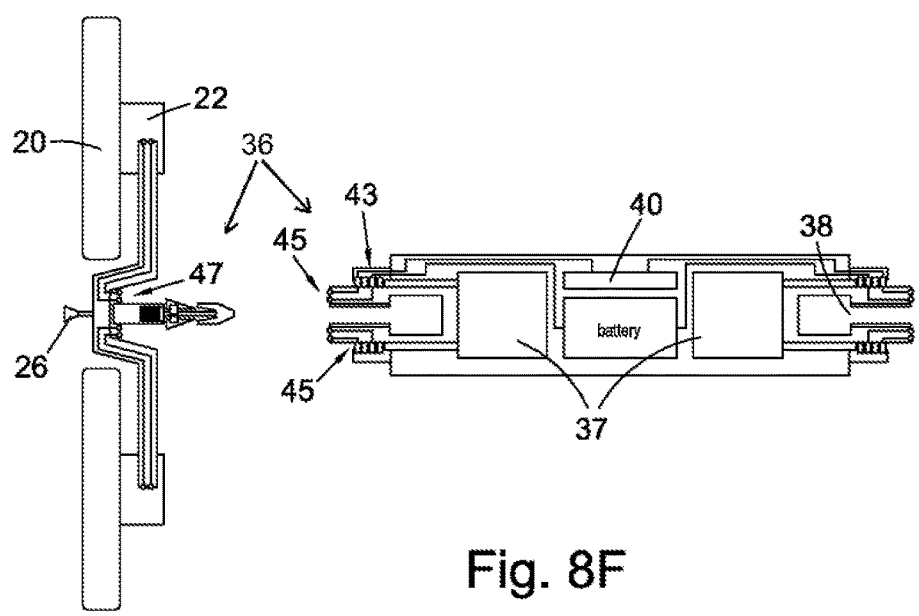

FIG. 8F shows one possible embodiment of an electrical connector for providing electric continuity between the wheel cluster and the platform 30. Components of the connector include a slip ring 43 fixed to the platform, a plurality of brush connections 45 disposed at the end of the drive shaft 35, and mating connections 47 provided on the wheel carrier 24. The brush connections 45 are configured to make a pressure connection with the mating connections 47 when the latch 36 is engaged to secure the wheel carrier 24 to the platform 30. The slip ring 43 and mating connections 45, 47 enable communication of data and/or electronic commands between the wheels 20 and the platform 30 in addition to providing power to the motors mounted in the wheel hubs 21.

As may be seen from the above description of FIGS. 8A-8F, there is provided a device for transporting a payload over a varied terrain comprising: a first wheel cluster comprising two or more wheels in a planar configuration; a second wheel cluster comprising two or more wheels in a planar configuration; and a planar platform configured to accommodate the payload; wherein each of the wheel clusters is provided with a connector comprising an electrical connection for connection of the cluster to the platform such that the device can be separated into three planar parts.

Many devices that would otherwise be suited to first/last mile transportation cannot be suitably broken down and stowed. Space is at a premium in most forms of human transportation so whether it is an overcrowded commuter train or a car or van used for private or commercial use, the device must be capable of being flat packed in order to be accommodated whilst the user travels.

The provision of the device as three planar parts enables assembly and/or breakdown of the device by a user in just two steps without any tools being required.

The platform may be provided with a non-slip surface. This is especially important if the device is deployed to carry an inanimate cargo as there will be no feedback from the user until the point of failure if the cargo slips off.

The connector may include a release button for each wheel cluster which may be provided on either the wheel cluster or on the platform. If the release button is provided on the platform, one release button may be provided for each wheel cluster. The release button may be released by pulling or pushing. The connector may further comprise a sprung peg, which may be mounted on the platform or on the wheel cluster. The connector may further comprise sprung ball bearings.

The electrical connection between the platform and the wheel cluster may be provided using a slip ring, which may be mounted on the platform. The electrical connection may be further configured to enable data to be transferred between the wheel cluster and the platform.

The device may have a minimum range of 5 km between charges. The device can be charged from a 12V DC supply such as is commonly available in passenger vehicles. This is advantageous if the device needs to be used for first and last miles of journey as it can be charged in transit within a car or van.

Alternatively, or additionally, the device can be charged from high power 12V car/van charger with 500 W output, which takes about 20 minutes. This is quicker, but not all users will have access to this charging option so it is important that it is one of numerous options available. Alternatively, or additionally, the device can be charged from AC domestic socket which takes about 20 minutes making it a quicker charging option than the 12V supply within a car.

The device is preferably sufficiently light for the user to lift is one handed. For example, it may have a weight in the region of 10-15 kg.

Figure 9:
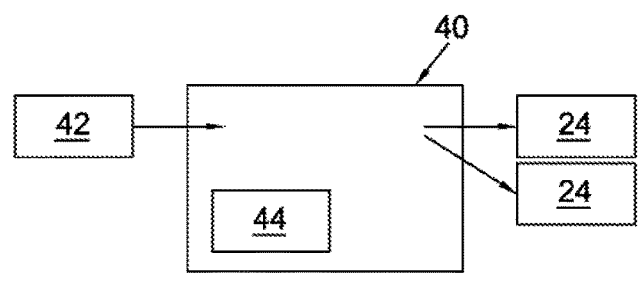
FIG. 9 is a schematic showing the constituent parts of a control system.

FIG. 9 is a schematic illustration of a control system 40. The control system 40 is preferably enclosed within the platform 30, as shown schematically in FIG. 8F. The control system 40 includes inputs (for the purposes described elsewhere in this document, as is understood by persons of skill in the pertinent art) from one or more sensors 42 which may include accelerometers, step detection sensors, gyroscopic sensors, weight/strain transducers and collision avoidance sensors (optical, radio frequency, laser, sonic, ultrasonic, etc.). The control system 40 provides instructions to the hub-mounted motors within each of the hubs, via the wheel carriers 24.

The control system 40 may also be provided with a wireless/RF communications link 44 (Wireless Local Area Network or WiFi®, for example). This enables tethering of the device to another device, such as the user's mobile phone. The device may be configured to transport loads unassisted in tethered or autonomous modes. In this context, tethered refers to a digital connection via WiFi® or other similar Wireless Local Area Network or BlueTooth®. Via the digital connection, the device is tethered to a second device, which could be a user's smart phone or another device as set out above. The device accelerates or decelerates in order to remain within a predetermined range of the device to which it is tethered. So, if the device is tethered to the user's smartphone and the user, carrying their smartphone, starts to walk in a first direction, the device will automatically follow the user's smartphone, maintaining a predetermined distance from the user. In this context, autonomous refers to the use of pre-programmed instructions including following a series of instructions or an instruction to follow a map. Typically, when operating in an autonomous mode, the destination is known, whereas the destination may be unknown when operating in a tethered mode.

Figure 10:
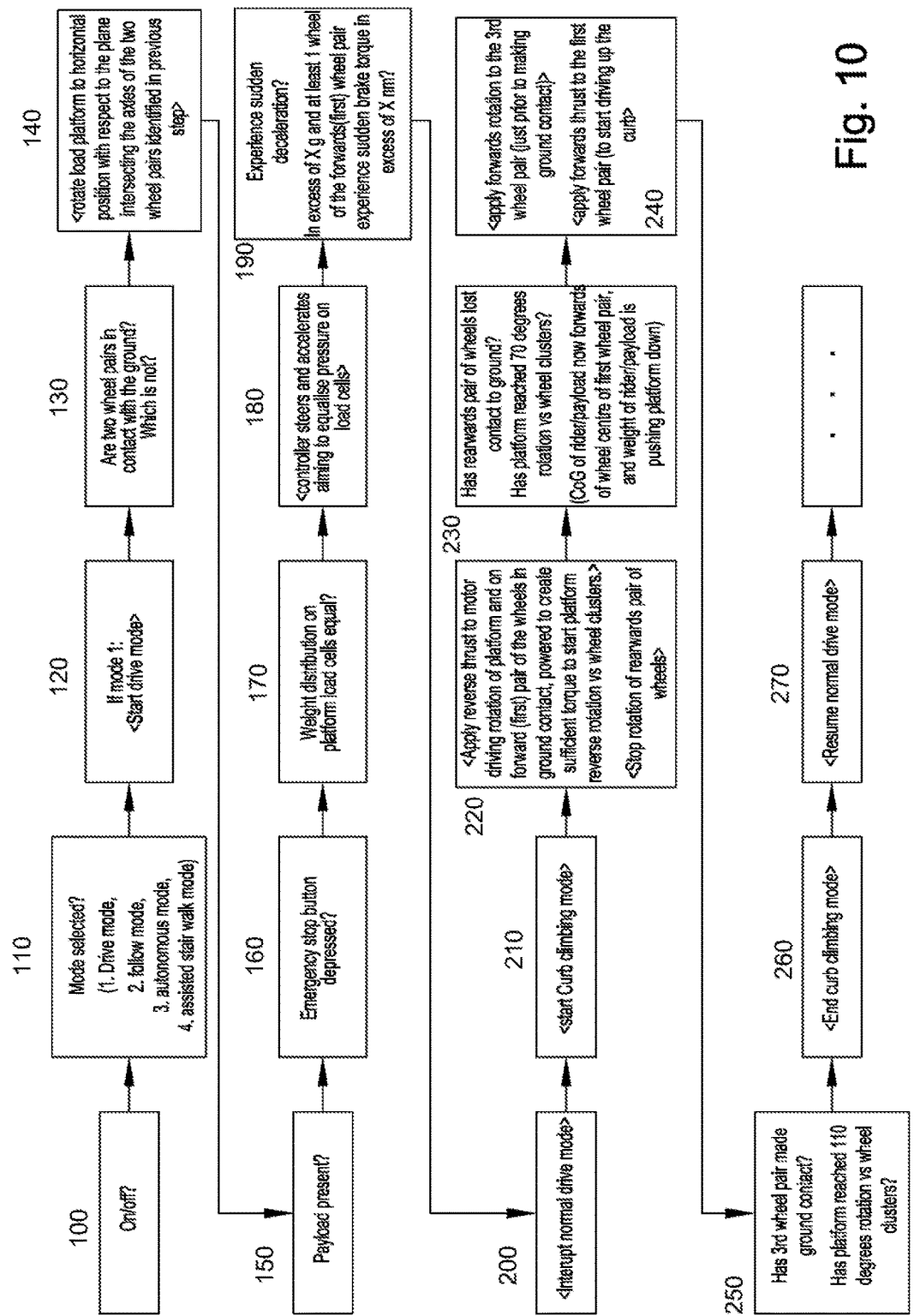
FIG. 10 is a flow diagram showing one example of the steps associated with setting up the device.

FIG. 10 shows schematically the aspects of the control system 40 as they would appear to a user. After it is switched/powered on (block 100), the device 10 can be used in a variety of different modes, including drive mode, follow mode, autonomous mode and assisted stair walk mode. The first action of the user is to select the appropriate mode for the intended usage [block 110]. As in the example of FIG. 10, if drive mode is selected [block 120], then the control system interrogates the system sensors to identify whether two co-axial wheel pairs are in contact with the ground [block 130]. Provided that this condition is satisfied, then the control system instructs the motor in the platform to rotate the platform relative to the wheels so that the device is configured with the platform horizontal and ready to receive a load [block 140]. The control system then senses the presence of the payload [block 150]. Provided a payload is present, the control system then proceeds to perform various pre-launch checks including: whether the emergency stop button pressed [block 160]; and whether the weight distribution of the payload is sufficiently even to allow safe operations [block 170. The device is then ready to move forward in drive mode, in which the controller steers and accelerates in response to operator/rider inputs, aiming to equalize pressure on pressure pads (load cells) disposed on or adjacent to the top surface of the platform [block 180].

If, whilst driving, the control system detects, via an accelerometer or other suitable sensor, a sudden deceleration [block 190], then normal drive mode is interrupted and curb climbing mode is initiated [blocks 200, 210]. In this context, a sudden deceleration may be defined as either a deceleration exceeding a predetermined threshold value and/or at least one wheel of the forwards wheel pair experiences a sudden brake torque in excess of a predetermined threshold. Once curb climbing mode is initiates, the control system applies a reverse thrust to the motor driving rotation of the platform and also to the forwards co-axial pair of wheels in contact with the ground [block 220]. This creates sufficient torque to start the platform rotating back relative to the wheels. The control system also ensures that the hub motors in the rearward set of wheels are stopped so that the rear co-axial pair of wheels is no longer powered to rotate.

The control system then guides the device through a curb climbing operation. The system detects whether the rearward pair of wheels has lost contact with the ground. The system also detects whether the platform has reached 70° rotation relative to the wheel clusters [block 230].

Just prior to the third pair of wheels, i.e. those that were not active during the immediately preceding drive mode phase, touching the ground, forward rotation is applied to these wheels [block 240]. Forwards thrust is also applied to the first co-axial wheel pair in order to aid this co-axial wheel pair driving up the curb.

The system senses the completion of the curb climbing operation by detecting contact between the third co-axial pair of wheels and the ground [block 250]. As an ancillary check, the system also detects the degree of rotation of the platform relative to the wheel clusters. Provided that this rotation exceeds 110°, the device is deemed to have completed the curb climbing operation [block 260]. Once the curb climbing operation is complete the control system automatically switches back to normal drive mode [block 270]. The device 10 remains in normal drive mode until the user actively selects a different mode or until a further sudden deceleration is detected tripping the system into curb climbing mode again or until the sensor identifies that the device 10 is approaching a step down requiring the device to move into a step descending mode.

Figures 11A, 11B, 11C:
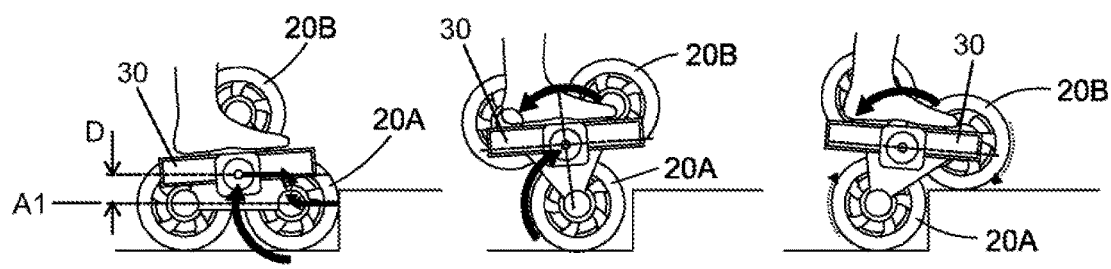
FIGS. 11A to 11C show the device of FIG. 6 climbing a step.

FIGS. 11A, B and C show the three-wheel cluster vehicle step climbing. When the device hits a curb, as shown in FIG. 11A, the forward motion of the device is resisted by an equal and opposite force exerted by the curb on the front wheels (20A) that touch the curb. The payload 66 is thrust forwards relative to the, now stationary, device 10, by its own kinetic energy. The device is configured such that the force of the curb on the wheel 20A acts below the rotation axis of the platform 30. The kinetic energy of the payload, transferred via friction between shoes and platform, initiates a forward rotation motion (clockwise as viewed in FIGS. 11A-11C) of the wheel carrier 24 about the front wheel axis (20A). Because the platform 30 is configured to rotate independently from the wheel carrier 24 about its own axis, then the platform rotates backwards (counterclockwise) relative to the wheel carrier to permit the device to continue to move forwards past the obstruction of the curb and to transfer the weight of the payload onto the co-axial wheel pair 20B that has been rotated and placed on top of the curb (FIG. 11C).

The powered rearward rotation of the platform 30 assists the forwards rotation of the wheel cluster to bring the formerly redundant wheels 20B forwards onto the curb. The platform 30 rises and falls slightly during the rotation of the wheel cluster. This means the rotation energy between platform and wheel clusters must be sufficient to lift the payload during the rise portion of the motion. Part is kinetic energy and part is the exactly timed reverse rotation of the platform axle motor 37 (shown in FIGS. 8A-8F).

As illustrated in FIG. 11A, the rotation axis of the payload-carrying platform 30 is higher than the wheel axis $A_1$ that makes contact with the curb/step by a distance indicated as D. The resulting force vector offset of the opposite directed forces creates torque around the axle of wheel 20A, initiating lift of the platform 30, resulting in rotation of the device 10. This forward rotation of the device 10 is assisted by timed reverse thrust on the front wheel 20A only and controlled torque applied to axis of the platform 30. Once the forward-moving wheel 20B contacts upper step as shown in FIG. 11C, forward drive torque is applied to both wheels 20A and 20B to pull lower wheel 20A up onto the upper step, again assisted by controlled torque applied to axis of the platform 30 via motor(s) 37.

If the device 10 has gyroscopic control, the user achieves the illustrated sequence by firstly slowing the device by leaning back, as illustrated in FIG. 11A, where the user's heel is lower than the toe, indicating that the user is leaning back in order to slow the device 10. When the front wheel 20A hits the curb, the momentum initiates rotation of the device 10 around the front wheel 20A. Controlled torque through wheels 20A and 20B and the platform 30 permits the climbing motion. Once the upper level has been achieved, the user can accelerate again by leaning forwards.

In this context, the gyroscopic control would encompass a gyroscopic sensor and a weight/strain transducer. The gyroscopic sensor is configured to sense the actual motion of the device. The weight/strain transducer senses user input. Together they create a feedback loop comparing actual motion to desired user motion.

It will be understood that the same process will occur in the second cluster of three wheels provided on the other side of the device, but these are not shown in the interests of clarity.

Figures 12A, 12B, 12C:
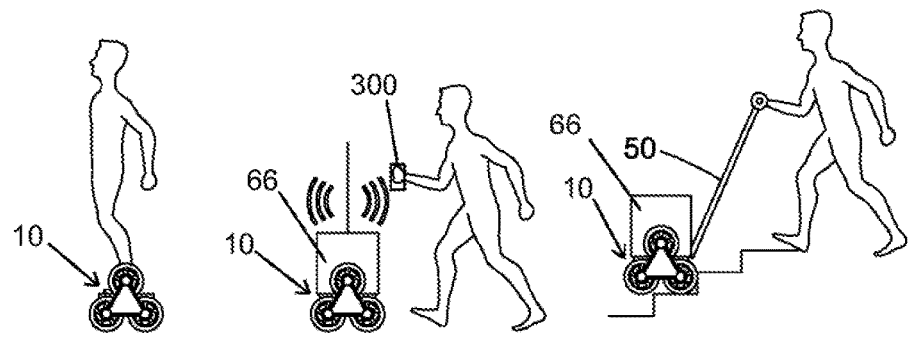
FIGS. 12A to 12C show various modes of operation of the device of FIG. 6.

FIG. 12 shows three usage modes. Each of these modes can be deployed sequentially without any alteration to the device. In FIG. 12A a human user is conveyed. In FIG. 12B the device 10 supports a load and has WiFi® connectivity enabling the device 10 to be tethered to the user's smart phone 300. The device 10 carries a payload 66 and accelerates, decelerates and steers in order to remain within an acceptable range of the user at all times.

In FIG. 12C the user guides the device manually using an extendable lever 50 that is otherwise retracted into the platform 30. Lever 50 serves as a torque balance lever to enable improved semi-autonomous transportation. The lever 50 may be retractable/extendable. The lever 50 allows an operator to assist the device, without bearing any of the weight of the payload. For example, climbing a curb from a stationary condition, the payload has no kinetic energy to carry it forward. So, if the platform rearward rotation started, then the platform would simply tip rearwards and the payload would fall off the back of the device. With the provision of the lever 50, the operator holds the lever steady to ensure that the wheel clusters turn forward and the device starts to climb the stairs. The lever may be configured to enable the user to provide a counterbalance to avoid the toppling of an inanimate payload. Without the provision of a lever, an inanimate payload could topple from the device during a step climbing operation. The lever enables the user to counter the forces applied by a motor within the platform which powers the rotation of the platform relative to the first and second wheel clusters.

Figure 13:
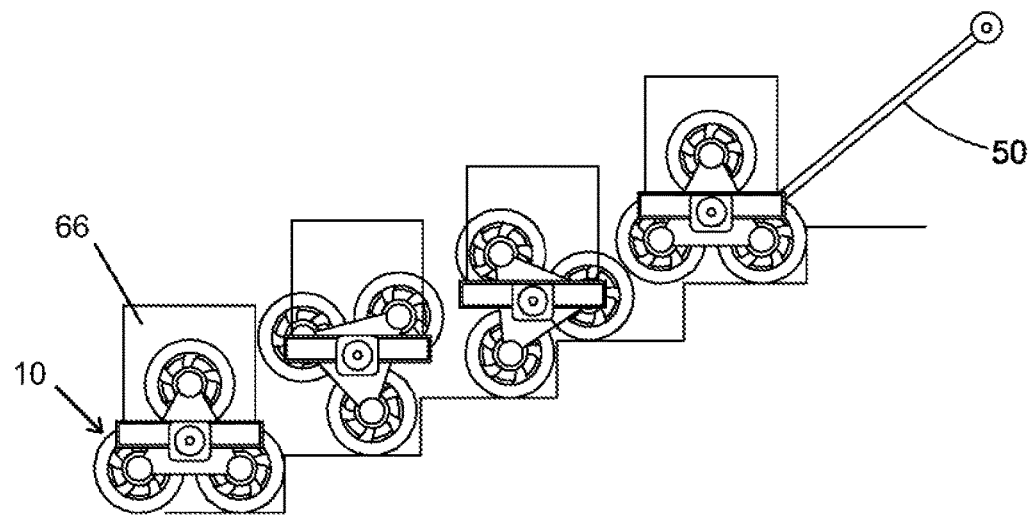
FIG. 13 shows the device of FIG. 6 descending a flight of stairs.

FIG. 13 shows the device 10 in stair climbing mode. The powered rotation of the two of each trio of co-planar wheels in contact with the steps at any one time enables the sequence required to lift the device up a single curb to be repeated in order to enable the device to climb stairs.

The user (not shown) may assist the action of the device 10 by holding an extendable lever 50 which acts as a physical torque reaction lever.

Figures 14A, 14B:
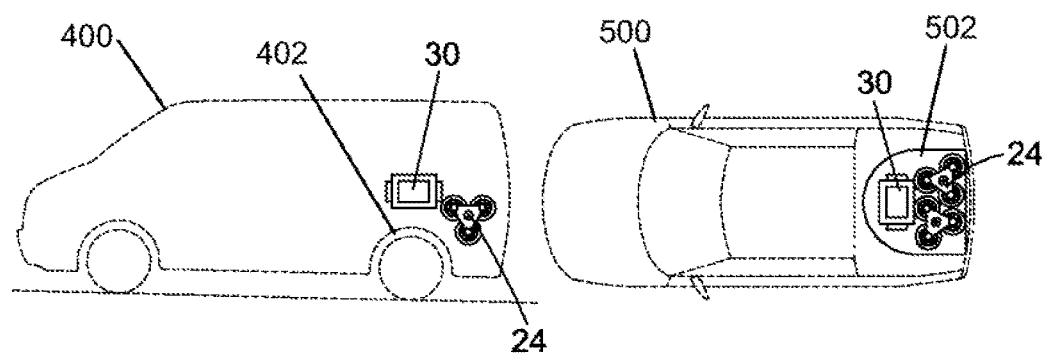
FIGS. 14A and 14B show the stowage of the device in a vehicle.

FIGS. 14A and 14B shows two examples of ways in which a transportation device according to the present invention may be carried in a passenger vehicle after the wheel clusters are separated from the platform to allow compact carriage. In FIG. 14A, a low-floor van 400 is shown with each wheel cluster 24 located behind a rear wheel arch 402, one at each side of the vehicle, and the platform 30 located on top of one of the wheel arches. In FIG. 14B, which is a schematic of a car 500 with a wheel well 502, each of the wheel carriers 24 and the platform 30 fit in the well under the load floor. This carriage option takes full advantage of the fact that all three component parts 30, 24 are generally planar and relatively thin, and therefore may be positioned generally parallel with one another for storage/carriage in a very compact fashion.

The device may have a top speed which is limited in order to be compliant with any local or state laws which regulate operation of power boards and the like. See, for example, California AB604-2016 which sets a speed limit of 25 kph. This focuses on the utility of the device: there would be no merit in producing a technically brilliant device that could not be used as a result of incompatibility with local regulations. This device has been developed with relevant legislation in mind.

The device may further comprise a receptacle for holding inanimate payloads, which receptacle may be a flip-box storage device which is configured to be folded flat when not in use. Such a storage device can be deployed to hold multiple unconnected items, for example grocery shopping.

It will further be appreciated by those skilled in the art that although the invention has been described by way of example with reference to several embodiments it is not limited to the disclosed embodiments and that alternative embodiments could be constructed without departing from the scope of the invention as defined in the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device comprising:
   a platform for carrying a payload;
   first and second wheel clusters mounted to the platform at respective opposite first and second ends thereof, each cluster comprising an arm attached to the platform for rotating movement relative thereto about an axis and for translating movement relative thereto between a first position with the axis adjacent a first end of the arm and a second position with the axis adjacent a second end of the arm, and a first and a second wheel rotatably mounted to respective first and second ends of the arm;
   a plurality of motors powering the rotation and translation of the wheel clusters relative to the platform and the rotation of the wheels relative to the arms; and
   a controller commanding the plurality of motors to enable stable rolling movement of the device over a surface with only one wheel of each cluster in contact with the surface.

2. The device according to claim 1, wherein an upper surface of the platform defines a payload-carrying plane, and the first and second wheel clusters define respective planes that are mutually parallel and orthogonal to the payload-carrying plane.

3. The device according to claim 1, wherein the controller commands rotation and translation of the clusters in a manner to maintain the platform in a substantially horizontal orientation.

4. The device according to claim 3, wherein the controller commands at least one of the plurality of motors in a manner to create angular rotation of the wheel clusters with respect to the platform to allow the device to negotiate a step.

5. The device according to claim 1, further comprising at least one sensor detecting an approaching step and providing an input to the controller.

6. The device according to claim 5, wherein the at least one sensor comprises an optical sensor.

7. The device according to claim 1, further comprising at least one sensor detecting a leaning motion of a user standing on the platform and providing an input corresponding to the leaning motion to the controller.

* * * * *